US011310730B2

United States Patent
Huang et al.

(10) Patent No.: US 11,310,730 B2
(45) Date of Patent: Apr. 19, 2022

(54) METHOD OF CONNECTING TO NETWORK FOR HOME APPLIANCE, HOME APPLIANCE, AND METHOD OF CONNECTING TO NETWORK FOR HOME APPLIANCE SYSTEM

(71) Applicant: QINGDAO HAIER WASHING MACHINE CO., LTD., Shandong (CN)

(72) Inventors: Zhenxing Huang, Shandong (CN); Sheng Xu, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 361 days.

(21) Appl. No.: 16/341,887

(22) PCT Filed: Oct. 12, 2017

(86) PCT No.: PCT/CN2017/105909
§ 371 (c)(1),
(2) Date: Apr. 12, 2019

(87) PCT Pub. No.: WO2018/068750
PCT Pub. Date: Apr. 19, 2018

(65) Prior Publication Data
US 2019/0246346 A1     Aug. 8, 2019

(30) Foreign Application Priority Data
Oct. 12, 2016   (CN) .......................... 201610889163.9

(51) Int. Cl.
*H04W 88/02*     (2009.01)
*H04W 48/18*     (2009.01)
(Continued)

(52) U.S. Cl.
CPC ............. *H04W 48/18* (2013.01); *H04L 12/28* (2013.01); *H04W 48/10* (2013.01); *H04W 48/16* (2013.01); *H04W 84/12* (2013.01); *H04W 88/02* (2013.01)

(58) Field of Classification Search
CPC ..... H04W 48/10; H04W 48/16; H04W 48/18; H04W 84/12; H04W 88/02; H04L 12/28
See application file for complete search history.

(56) References Cited

U.S. PATENT DOCUMENTS

| 2014/0024310 A1 | 1/2014 | Dua | |
| 2014/0105196 A1* | 4/2014 | Seok | H04W 60/04 370/338 |

(Continued)

FOREIGN PATENT DOCUMENTS

| CN | 104219734 A | 12/2014 |
| CN | 104469789 A | 3/2015 |

(Continued)

OTHER PUBLICATIONS

Extended European Search Report received in Application No. 17860522.6-1216 dated Apr. 30, 2020.

*Primary Examiner* — Brian P Cox
(74) *Attorney, Agent, or Firm* — Arent Fox Schiff LLP

(57) ABSTRACT

Disclosed are a method of connecting to a network for a home appliance, a home appliance, and a method of connecting to a network for a home appliance system. The method of connecting to a network for a home appliance includes: in response to a network connection failure of a WiFi module in the home appliance when the WiFi module is in a monitoring mode for network connection, entering, by the WiFi module, a hotspot mode for network connection. This method provides favorable compatibility, is simple in operation, high in network connection efficiency, and provides favorable user experience. A home appliance employ- (Continued)

ing the network connection method can easily communicate with a network, enabling simple remote control of the home appliance.

12 Claims, 4 Drawing Sheets

(51) Int. Cl.
*H04W 48/10* (2009.01)
*H04L 12/28* (2006.01)
*H04W 48/16* (2009.01)
*H04W 84/12* (2009.01)

(56) References Cited

U.S. PATENT DOCUMENTS

2015/0358364 A1* 12/2015 Lee .................... H04L 65/1069
 709/219
2016/0073259 A1 3/2016 Lee et al.
2017/0041977 A1* 2/2017 Yokoyama .............. H04L 63/10

FOREIGN PATENT DOCUMENTS

| | | |
|---|---|---|
| CN | 104994527 A | 10/2015 |
| CN | 105072012 A | 11/2015 |
| CN | 105208583 A | 12/2015 |
| JP | 2005333378 A | 12/2005 |
| JP | 2006054834 A | 2/2006 |
| JP | 2007179330 A | 7/2007 |
| JP | 2014060623 A | 4/2014 |
| JP | 2015115925 A | 6/2015 |

* cited by examiner

METHOD OF CONNECTING TO NETWORK FOR HOME APPLIANCE, HOME APPLIANCE, AND METHOD OF CONNECTING TO NETWORK FOR HOME APPLIANCE SYSTEM

CROSS REFERENCE TO RELATED APPLICATIONS

This is a U.S. National Stage Application, filed under 35 U.S.C. 371, of International Patent Application No. PCT/CN2017/105909, filed Oct. 12, 2017, which claims priority to Chinese Patent Application No. 201610889163.9, filed Oct. 12, 2016, disclosures of both of which are incorporated herein by reference in their entirety.

TECHNICAL FIELD

The present disclosure relates to the technical filed of intelligent home appliance control and, for example, to a method of connecting to a network for a home appliance, a home appliance, and a method of connecting to a network for a home appliance system.

BACKGROUND

Spatial compression and time extension are made possible by the three-network integration of the telecommunication network, the Internet, and the TV network as well as the "four screens in one" of a TV, a mobile phone, a PAD, and a computer. Intelligentization is the trend development of the times. After the three-network integration and the Internet of Things technology are applied, appliances such as refrigerators, electric lights, air conditioners, televisions, DVDs, stereos, microwave ovens, washing machines, etc. will enter the intelligent era, and the home appliances can be conveniently controlled by mobile phones or other integrated devices.

A home appliance system in the related art, as shown in FIG. 1, includes a home appliance 1 (a washing machine in the figure) internally provided with a WiFi module, a router 2, a server 3, and a mobile terminal 4. The control of the mobile terminal 4 over the home appliance 1 is achieved through network connection. To achieve this intelligent control, the home appliance is first connected to the network, and most of the home appliances are displayed by the digital tube without a touch screen, so the WiFi module cannot be directly configured on the operation panel to be connected to the router. It is usually necessary to set the WiFi module to enter a hotspot mode, and then the mobile terminal is connected to the WiFi and indirectly sends router configuration information to the WiFi module, and finally the WiFi module is restarted to be connected to the router. This network connection method provides good compatibility, but the operations are cumbersome leading to poor user experience. There is another network connection method in which the WiFi module of the home appliance is set into a monitoring mode, the configuration information of the router is sent to the home appliance in a broadcast packet through the mobile terminal, and the home appliance receives the broadcast packet, then automatically parses the configuration information and is connected to the router. This method is easy to operate. The mobile terminal does not need to switch between networks during the configuration process, but the method is poorly compatible. If a special mobile terminal and router are encountered, the configuration cannot be successful.

SUMMARY

The present disclosure provides a network connection method with good compatibility and simple operation for a home appliance, a home appliance using the network connection method, and a network connection method with good compatibility and simple operation for a home appliance system.

A method of connecting to a network for a home appliance includes the following operations.

A WiFi module in the home appliance receives network connection trigger message.

The WiFi module enters a monitoring mode according to the network connection trigger message.

If the WiFi module successfully receives and parses a network configuration information broadcast packet in the monitoring mode, the home appliance connects to network.

If the home appliance fails to connect to the network, the WiFi module enters a hotspot mode according to the network connection trigger message.

If the WiFi module successfully receives network configuration information in the hotspot mode, the home appliance connects to the network.

In some embodiments, the operations that the home appliance fails to connect to the network includes the following cases.

That is, the WiFi module fails to receive the network configuration information broadcast packet within a first preset period of time T1, or the WiFi module fails to parse the network configuration information broadcast packet within a second preset period of time T2.

In some embodiments, the method of connecting to the network for the home appliance further includes: in response to the WiFi module failing to receive the network configuration information within a third preset period of time T3, or in response to the WiFi module receiving the network configuration information within a fourth preset period of time T4 but the home appliance fails to connect to the network, it is determined that the network connection fails and is ceased.

In some embodiments, the method further includes the following operations subsequent to that the network fails is ceased.

The home appliance automatically drives the WiFi module to enter the monitoring mode or the hotspot mode or to switch between the monitoring mode and the hotspot mode for connecting to the network within a preset time, or a button on the home appliance is touched for manually driving the WiFi module to enter the monitoring mode or the hotspot mode or to switch between the monitoring mode and the hotspot mode for connecting to the network within a preset time.

In some embodiments, a duration of the first preset period of time T1 is less than or equal to that of the second preset period of time T2, and a duration of the third preset period of time T3 is less than or equal to that of the fourth preset period of time T4.

In some embodiments, the operation of receiving the network connection trigger message includes the following cases: a button on the home appliance is touched to send the network connection trigger message to the WiFi module, and the WiFi module receives the network connection trigger message, or in the case where the home appliance has not connected to a network or has not successfully connected to a network after being shipped from a factory, the WiFi module automatically receives the network connection trigger message after being turned on.

In some embodiments, the network configuration information broadcast packet or the network configuration information includes at least one selected from the group consisting of a service set identifier (SSID) and password information of a router, and a unique identification code of a mobile client.

There is also disclosed a home appliance that includes a processor, a memory, and a WiFi module.

The memory is configured to store a software program, a computer-executable program and module. The processor is configured to execute a plurality of functional applications and perform data processing by running the software program, instructions, and the module, enabling the WiFi module to connect to a network by using any of the methods mentioned above.

There is further disclosed a method of connecting to a network for a home appliance system that includes the following operations.

A mobile terminal is connected to a router.

A WiFi module in a home appliance enters a monitoring mode. If the WiFi module successfully receives and parses a router network configuration information broadcast packet sent by the mobile terminal, the home appliance connects to a network of the router, and when the mobile terminal finds the home appliance connected to the network of the router, the mobile terminal sends information of the home appliance and information of a user to a server.

If the home appliance fails to connect to the router network, the WiFi module enters a hotspot mode. If the WiFi module successfully receives router network configuration information sent by the mobile terminal, the home appliance connects to the router network, and when the mobile terminal finds the home appliance connected to the router network, the mobile terminal sends the information of the home appliance and the information of the user to the server.

In some embodiments, when the WiFi module is in the monitoring mode and the mobile terminal fails to find the home appliance connected the router network within a fifth preset period of time Ta, the mobile terminal fails to send the information of the home appliance and the information of the user to the server, and meanwhile if the mobile terminal finds a home appliance WiFi hotspot around the mobile terminal, the mobile terminal sends the router network configuration information to the WiFi module in the home appliance; and if the mobile terminal fails to find the WiFi hotspot of the home appliance around the mobile terminal, a network connection process of the home appliance system is stopped.

When the WiFi module is in the hotspot mode and the mobile terminal fails to find the home appliance communicating with the router network within a sixth preset period of time Tb, the network connection process of the home appliance system is stopped.

There is still further disclosed a home appliance system that includes a home appliance, a router, a server, and a mobile terminal. The home appliance includes a WiFi module configured to connect the home appliance to the router, where the home appliance connects to the server via the router.

The WiFi module is configured to receive network connection trigger message, and enter a monitoring mode according to the network connection trigger message. If a network configuration information broadcast packet is successfully received and parsed in the monitoring mode, the home appliance connects to a network; and if the home appliance fails to connect to the network, the WiFi module enters a hotspot mode according to the network connection trigger message, and if network configuration information is successfully received in the hotspot mode, the home appliance connect to the network.

The server is configured to provide home appliance management platform services. The service includes registration and management of a user account, binding and management of the home appliance and the user account, sending a control command to the home appliance, and receiving information reported by the home appliance.

The mobile terminal is in communication with the router and the server.

There is still further disclosed a computer-readable storage medium that stores computer-executable instructions for executing the above methods.

A home appliance device is provided and includes one or more processors, a memory, a WiFi module, and one or more programs. The one or more programs are stored in the memory, and when the one or more programs are executed by the one or more processors, the one or more processors enable the WiFi module to execute the above method.

A computer program product is provided and includes a computer program stored on a non-transient computer-readable storage medium. The computer program includes program instructions that, when executed by a computer, enable the computer to execute any method described above.

For the method of connecting to a network for the home appliance, the home appliance, and the method of connecting to a network for the home appliance system provided by the present disclosure, first the WiFi module in the home appliance is in the monitoring mode for network connection. If the network connection fails, the WiFi module enters the hotspot mode for network connection. This network connection method provides favorable compatibility, is simple in operation, has a high network connection efficiency, and provides favorable user experience. Home appliances using this network connection method are also easier to communicate with the network for achieving remote control.

Figure 1:
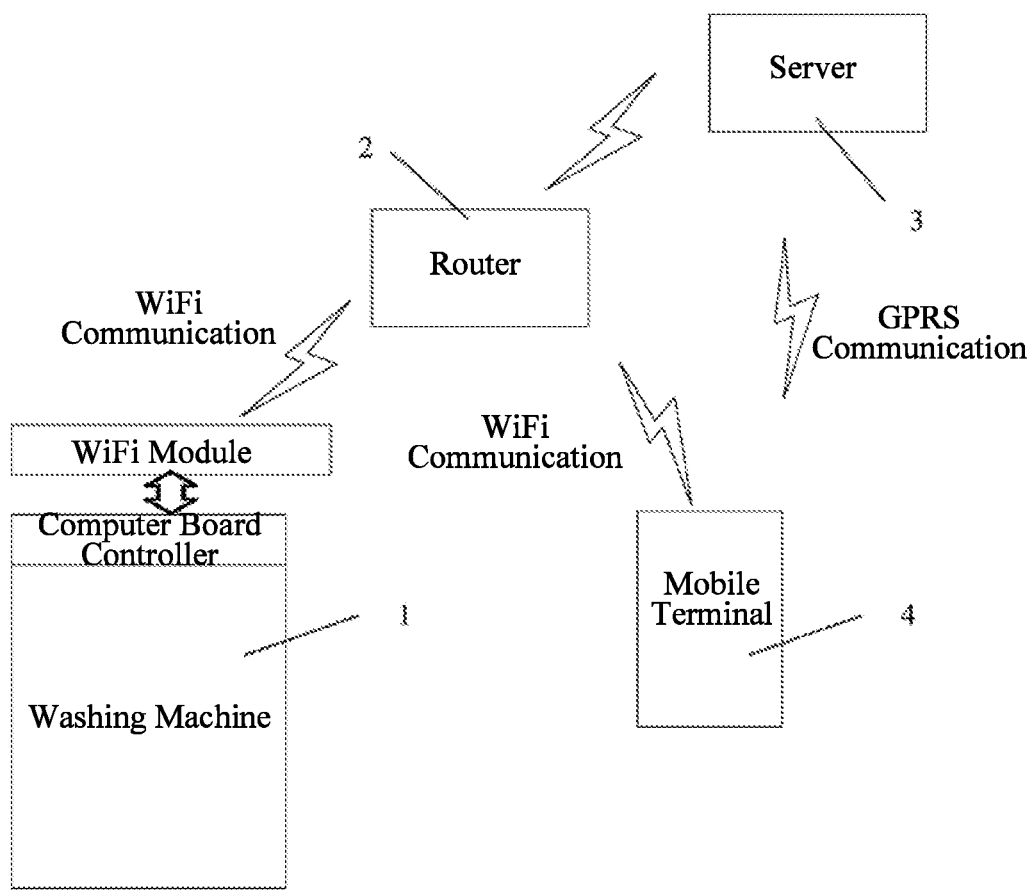
FIG. 1 is a schematic diagram illustrating networked communication of a home appliance system.

In the drawings:
1—Home Appliance,
2—Router,
3—Server,
4—Mobile Terminal.

DETAILED DESCRIPTION

The solutions of the present disclosure are described hereinafter through specific embodiments in conjunction with the drawings.

As illustrated in FIG. 1, a home appliance system includes a home appliance 1, a router 2, a server 3, and a mobile terminal 4. In the embodiment, the home appliance 1 is a washing machine, and a computer board controller in the home appliance 1 is a control component of the home appliance, and controls the automatic operation of the home appliance. The computer board controller communicates with the Internet through a networking component, a WiFi module, (the WiFi module may also be set as a separate module in addition to being set in the computer board controller) and is in communication with the server 3. The server 3 is configured to provide a home appliance management platform service. The service includes registration and management of a user account, binding and management of the home appliance and the user account, sending a control command to the home appliance, receiving information reported by the home appliance, and the like. A user may register an account at a server website to manage the home appliance. After the user installs a remote client, registers the account and binds the account with the home appliance through the mobile terminal 4 (e.g., mobile phone, PAD), a real-time view of the operating state of the home appliance and a remote control of the home appliance can be achieved.

Figure 2:
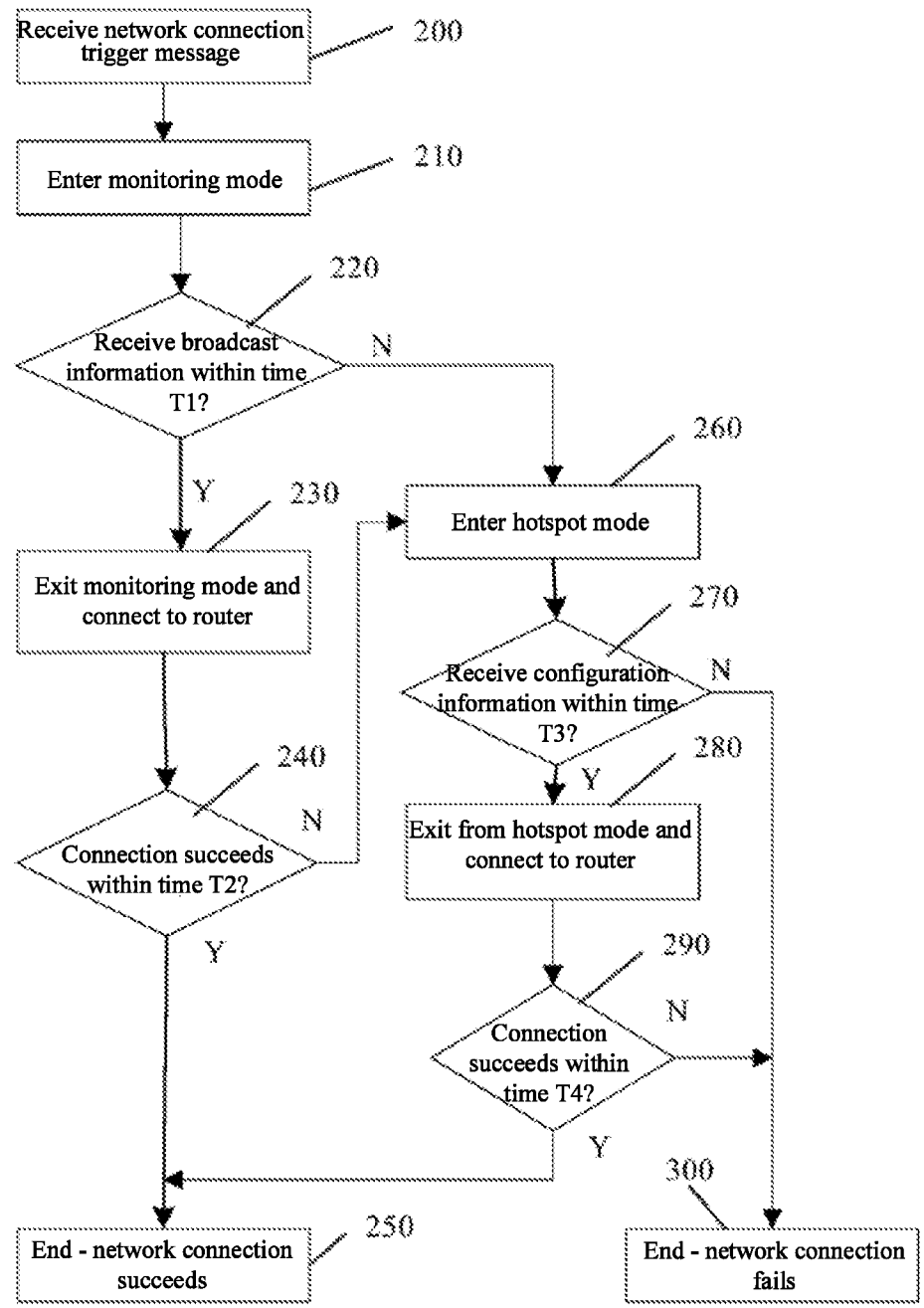
FIG. 2 is a flowchart illustrating a method of connecting to a network for a home appliance according to an embodiment of the present disclosure.

In order to achieve the above-mentioned intelligent control, the home appliance and the home appliance system need to be networked first. For this reason, an embodiment provides a method of connecting to a network for a home appliance. As illustrated in FIG. 2, the method includes the following operations.

In step 200, network connection trigger message is received.

In some embodiments, a button on a panel connected to the computer board controller and on the home appliance is touched to send the network connection trigger message to the WiFi module in the computer board controller of the home appliance, and the WiFi module receives the network connection trigger message.

The WiFi module receives the network connection trigger message; and if the home appliance has not connected to a network or has not successfully connected to a network after being shipped from a factory, the WiFi module automatically receives the network connection trigger message after being turned on. The method then proceeds to step 210.

In step 210, the WiFi module enters a monitoring mode, and if the WiFi module successfully receives and parses a network configuration information broadcast packet, the home appliance connects to the network. The method then continues to step 220.

In step 220, it is determined whether the WiFi module receives the network configuration information broadcast packet within the a first preset period of time T1. The method continues to step 230.

In step 230, if the WiFi module receives the network configuration information broadcast packet within the first preset period of time T1, the WiFi module exits the monitoring mode and connects to a router. The method continues to step 240.

In a step 240, it is determined whether the WiFi module is successfully connected to the router within a second preset period of time T2, that is, whether the WiFi module successfully parses the network configuration information broadcast packet within the second preset time T2. The method proceeds to step 250.

In step 250, if the WiFi module is successfully connected within the second preset time T2, the network connection is successful.

In order to improve network connection efficiency and avoid unnecessary waste of time resources, when the WiFi module is in the monitoring mode and if the WiFi module fails to receive the network configuration information broadcast packet within the first preset time T1 or fails to parse the network configuration information broadcast packet within the second preset time T2, the network connection fails, and the home appliance cannot connect to the network. The duration of the first preset time T1 is less than or equal to the duration of the second preset time T2. In this embodiment, T1=T2=1 minute, that is, if the WiFi module fails to receive the network configuration information broadcast packet within 1 minute or fails to parse the network configuration information broadcast packet within 1 minute, the network connection fails, and the home appliance cannot connect to the network. The method continues to step 260.

In step 260, if the WiFi module fails to receive the network configuration information broadcast packet within the first preset time T1, or if the WiFi module fails to be connected to the router within the second preset time T2, the WiFi module enters a hotspot mode.

If the home appliance fails to connect to the network through the monitoring mode, the WiFi module enters the hotspot mode, and if the WiFi module successfully receives the network configuration information, the home appliance connects to the network. The method continues to step 270.

In step 270, it is determined whether the WiFi module receives network configuration information within a third preset period of time T3. The method continues to step 280.

In step 280, if the WiFi module receives the network configuration information within the third preset time T3, the WiFi module exits the hotspot mode and is connected to the router.

In step 290, it is determined whether the WiFi module is successfully connected to the router within a fourth preset period of time T4, that is, whether the WiFi module successfully parses the network configuration information within the fourth preset period of time T4.

In step 250, if the WiFi module is successfully connected within the fourth preset time T4, the network connection is successful.

In step 300, if the WiFi module fails to receive the network configuration information within the third preset time T3, or if the WiFi module fails to be connected to the router within the fourth preset time T4, the network connection of the WiFi module fails.

Similarly, in order to improve the network connection efficiency and avoid waste of time resources, when the WiFi module is in the hotspot mode and fails to receive the network configuration information within the third preset time T3 or receives the network configuration information within the fourth preset time T4 but the home appliance fails to connect to the network, the network connection fails and is stopped. The duration of the third preset time T3 is less than or equal to the duration of the fourth preset time T4. In the embodiment, T3=T4=5 minutes, that is, if the network configuration information is not received within 5 minutes, or if the network configuration information is received within certain time T4 but the home appliance fails to connect to the network, the network connection fails and is stopped.

After the network connection of the WiFi module fails and is stopped, the method of connecting to a network for the home appliance provided in the embodiment includes the following operations.

The home appliance may, under the control of the computer board controller of the appliance, automatically drive the WiFi module to enter the monitoring mode or the hotspot mode or to switch between the monitoring mode and the hotspot mode for network connection within certain time, or a button on a panel connected to the computer board controller and on the home appliance is touched for manually driving the WiFi module to enter the monitoring mode or the hotspot mode or to switch between the monitoring mode and the hotspot mode for the network connection within the certain time.

After the automatic or manual driving described above, if the home appliance still fails to be connected to the network, the network connection process is finally stopped and the maintenance is awaited.

Generally, the home appliances in the home appliance system are mostly networked through a router. Therefore, the network configuration information broadcast packet or the network configuration information includes at least one selected from the group consisting of a service set identifier (SSID) and password information of a router, and a unique identification code of a mobile client.

In the network connection method utilized in the home appliance, first the WiFi module in the home appliance is in the monitoring mode for network connection. If the network connection fails, the WiFi module enters the hotspot mode for network connection. This network connection method provides favorable compatibility, is simple in operation, has a high network connection efficiency, and provides favorable user experience. Home appliances using this network connection method are also easier to communicate with the network for easily achieving remote control.

Figure 3:
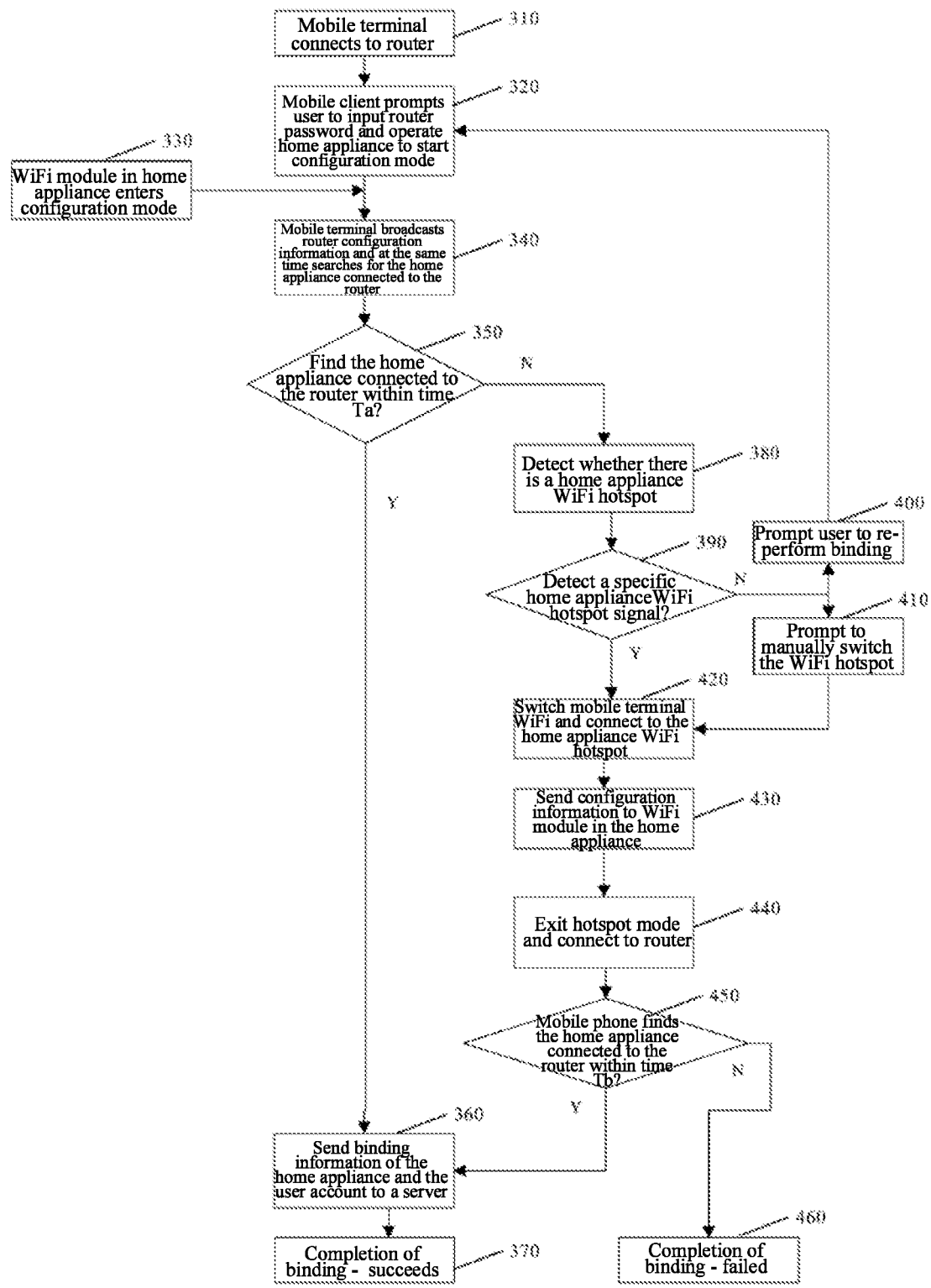
FIG. 3 is a flowchart illustrating a method of connecting to a network for a home appliance system according to an embodiment of the present disclosure.

In order to achieve the intelligent control of the home appliance system, components in the entire home appliance system need to be networked. For this reason, an embodiment further provides a method of connecting to a network for a home appliance system. As illustrated in FIG. 3, the method includes the following operations.

In step 310, a mobile terminal is connected to a router.

In step 320, mobile client software prompts a user to input a router password and operate the home appliance to start a configuration mode.

In step 330, a WiFi module in the home appliance enters the configuration mode.

A mobile terminal is connected to the router. Meanwhile when the mobile client software performs the network distribution, the mobile client software prompts the user to trigger the home appliance to enter the configuration mode and input the router password according to model information of the home appliance selected by the user, then the mobile terminal sends a router network configuration information broadcast packet and searches for the home appliance that is networked with the router.

The WiFi module in the computer board controller of the home appliance is triggered, enters a monitoring mode, and receives and parses the router network configuration information broadcast packet. If the WiFi module successfully receives and parses the router network configuration information broadcast packet sent by the mobile terminal, the home appliance connects to a network of the router, and when the mobile terminal finds the home appliance connected to the router network, the mobile terminal sends information of the home appliance and information of the user to a server to complete the networked binding.

In step 340, the mobile terminal broadcasts router network configuration information and searches for the home appliance connected to the router.

In step 350, it is determined whether the mobile terminal can search for the home appliance connected to the router network within a fifth preset period of time Ta.

In step 360, if the mobile terminal finds the home appliance connected to the router network within the fifth preset time Ta, the binding information of the home appliance and the user account is sent to the server.

In step 370, the binding is completed and the network connection is successful.

In order to improve the network connection efficiency and avoid waste of time resources, when the WiFi module is in the monitoring mode and if the mobile terminal fails to search for the home appliance connected to the router network within fifth preset time Ta, the mobile terminal fails to send the information of the home appliance and the information of the user to the server. Meanwhile if the mobile terminal finds a WiFi hotspot of the home appliance around the mobile terminal, the mobile terminal sends the router network configuration information to the WiFi module in the computer board controller of the home appliance; and if the mobile terminal fails to find the WiFi hotspot of the home appliance around the mobile terminal, a network connection process of the home appliance system is stopped and the user is prompted.

In step 380, if the mobile terminal fails to search for the home appliance connected to the router network within the fifth preset time Ta, the WiFi module enters a hotspot mode, and the mobile terminal detects whether the WiFi hotspot of the home appliance exists around.

In step 390, it is determined whether the mobile terminal detects a specific home appliance WiFi hotspot.

In step 400, if the mobile terminal fails to detect the WiFi hotspot signal of the specific home appliance, the user is prompted to reperform binding, and the step 320 is performed.

In step 410, if the mobile terminal fails to detect the WiFi hotspot signal of the specific home appliance, the user is prompted to manually switch the WiFi hotspot.

In step 420, if the mobile terminal detects the WiFi hotspot signal of the specific home appliance, the mobile terminal WiFi is switched, and the WiFi hotspot signal of the home appliance is connected.

In step 430, the mobile terminal sends the configuration information to the WiFi module in the home appliance.

In step 440, the WiFi module exits the hotspot mode and is connected to the router.

In step 450, it is determined whether the mobile terminal finds the home appliance connected to the router network within the sixth preset time Tb.

If the mobile terminal finds the home appliance connected to the router network within the sixth preset time Tb, the step 360 is performed.

In step 460, if the mobile terminal fails to find the home appliance connected to the router network within the sixth preset time Tb, the network-connected binding fails.

If the home appliance does not successfully connect to the router network, the WiFi module enters the hotspot mode. The mobile terminal automatically searches for the WiFi hotspot of the home appliance. If the mobile terminal cannot automatically search for the WiFi hotspot of the home appliance, the user manually searches for the WiFi hotspot of the home appliance through the mobile terminal. When the WiFi hotspot of the home appliance is found, the mobile terminal is connected to the WiFi hotspot of the home appliance and sends the router network configuration information to the home appliance.

If the WiFi hotspot of the home appliance is not found, the hotspot of the home appliance may be manually switched by touching a button on the panel connected to the computer board controller of the home appliance until the mobile terminal communicates with the WiFi hotspot of the home appliance and sends the router network configuration information to the home appliance; or the user is prompted to re-perform binding, and when the mobile client software performs the network distribution, the user is prompted to trigger the home appliance to enter the configuration mode according to the model information of the home appliance selected by the user.

If the WiFi module successfully receives the router network configuration information sent by the mobile terminal, the home appliance communicates with the router network, and the mobile terminal finds the home appliance connected to the router network, the mobile terminal sends the information of the home appliance and the information of the user to the server to complete the networked binding.

Similarly, in order to improve network connection efficiency and avoid waste of time resources, when the WiFi module is in the hotspot mode and the mobile terminal fails to find the home appliance connected the router network within the sixth preset time Tb, the network connection process of the home appliance is stopped, the networked binding failure is prompted to the user, and the maintenance is awaited.

In some embodiments, $Ta=Tb \geq T2$. In the embodiment, $Ta=Tb=75$ seconds, that is, when the WiFi module is in the monitoring mode and the mobile terminal fails to find the home appliance connected to the router network within 75 seconds, the mobile terminal cannot send the information of the home appliance and the information of the user to the server. When the WiFi module is in the hotspot mode and the mobile terminal fails to find the home appliance communicating with the router network within 75 seconds, the network connection process of the home appliance system is stopped.

In the network connection method utilized in the home appliance system provided by the embodiment, firstly the WiFi module in the home appliance is in the monitoring mode. After the mobile terminal and the home appliance are network connected to the same router, the information is uploaded to the server. If the network connection fails, the hotspot mode is entered. After the mobile terminal and the home appliance are network connected to the same router, the information is uploaded to the server. This network connection method utilized in the home appliance system provides better compatibility, is simpler in operation, has a high network connection efficiency, and provides better user experience.

An embodiment further provides a computer-readable storage medium storing computer-executable instructions for executing the method described above.

Figure 4:
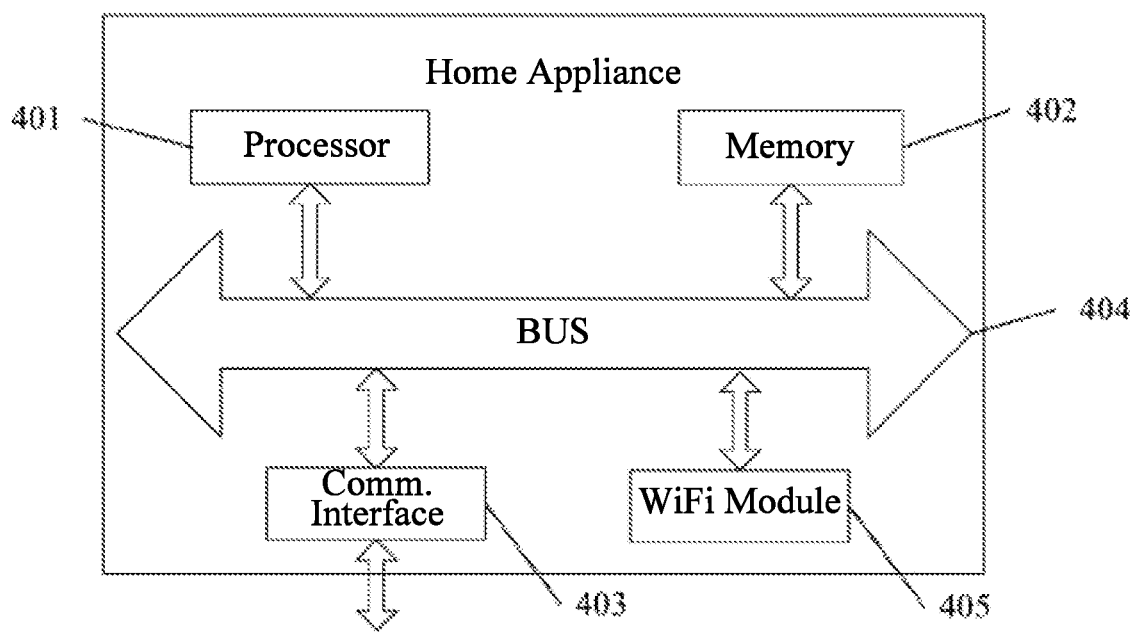
FIG. 4 is a schematic diagram illustrating a hardware structure of a home appliance device according to an embodiment of the present disclosure.

FIG. 4 is a schematic diagram illustrating a hardware structure of a home appliance device according to an embodiment. As illustrated in FIG. 4, the home appliance device includes a processor 401 and a memory 402, and may further include a communications interface 403, a bus 404 and a WiFi module 405.

The processor 401, the memory 402 and the communications interface 403 may complete communication with each other via the bus 404. The communications interface 403 may be used for information transmission, and the WiFi module 405 may be the WiFi module described in the above embodiments. The processor 401 may call logic instructions in the memory 402 to enable the WiFi module to execute any network connection method described in the above-mentioned embodiments.

The memory 402 may include a program storage region and a data storage region. The program storage region may store an operating system and an application program required by at least one function. The data storage region may store data created according to the use of the electronic device. In addition, the memory may include a volatile memory, such as a random access memory (RAM), and may also include a nonvolatile memory, such as at least one click memory, flash memory or another nonvolatile solid-state memory.

In addition, the logic instructions in the memory 402 may be implemented in the form of a software functional unit and, when sold or used as an independent product, may be stored in a computer-readable storage medium. Based on this understanding, the technical solutions provided by the present disclosure may be embodied in the form of a software product. The software product may be stored on a storage medium and includes several instructions for enabling a computer device (which may be a personal computer, a server or a network device, etc.) to execute all or part of the steps in the methods provided by the embodiments of the present disclosure.

The storage medium may be a non-transient storage medium, or may be a transient storage medium. The non-transient storage medium may include: a USB flash disk, a read-only memory (ROM), a random access memory (RAM), a magnetic disk, an optical disk or another medium capable of storing program codes.

All or part of the process steps in the methods of the above embodiments may be implemented by relevant hardware indicated by one or more computer programs, these programs may be stored in a non-transient computer-readable storage medium, and during the execution of these programs, the process steps in the above embodiments may be implemented.

INDUSTRIAL APPLICABILITY

For the method of connecting to a network for the home appliance, the home appliance, and the method of connecting to a network for the home appliance system provided by the present disclosure, first the WiFi module in the home appliance is in the monitoring mode for network connection. If the network connection fails, the WiFi module enters the hotspot mode for network connection. This network connection method provides favorable compatibility, is simple in operation, has a high network connection efficiency, and provides favorable user experience. Home appliances using this network connection method are also easier to communicate with the network for achieving remote control.

What is claimed is:

1. A method for connecting a home appliance to a network, comprising:
   receiving, by a WiFi module in the home appliance, a network connection trigger message;
   entering, by the WiFi module, a monitoring mode according to the network connection trigger message;
   in response to the WiFi module successfully receiving and parsing a network configuration information broadcast packet under the monitoring mode, connecting, by the home appliance, to the network;
   in response to the home appliance failing to connect to the network, entering, by the WiFi module, a hotspot mode according to the network connection trigger message;
   in response to the WiFi module successfully receiving network configuration information under the hotspot mode, connecting, by the home appliance, to the network;
   in response to the WiFi module failing to receive the network configuration information within a preset period of time T3, or in response to the WiFi module receiving the network configuration information within a preset period of time T4 but the home appliance fails to connect to the network, determining by the WiFi module that the network connection fails and is ceased; and after the network connection fails and is ceased:

automatically driving, by the home appliance, the WiFi module to switch between the monitoring mode and the hotspot mode for connecting to the network within a preset time; or manually driving the WiFi module to switch between the monitoring mode and the hotspot mode for connecting to the network within a preset time in response to a touch of a button on the home appliance:

after the automatically driving or manually driving the WiFi module to switch between the monitoring mode and the hotspot mode, in response to the home appliance still failing to connect to the network, determining by the WiFi module that the network connection stops and maintenance is needed.

2. The method of claim 1, wherein the home appliance failing to connect to the network comprises:

the WiFi module failing to receive the network configuration information broadcast packet within a first preset period of time T1, or the WiFi module failing to parse the network configuration information broadcast packet within a second preset period of time T2.

3. The method of claim 2, wherein a duration of the first preset period of time T1 is less than or equal to that of the second preset period of time T2; and a duration of the preset period of time T3 is less than or equal to that of the preset period of time T4.

4. The method of claim 1, wherein receiving the network connection trigger message comprises:

in response to a touch of a button on the home appliance to send the network connection trigger message to the WiFi module, receiving, by the WiFi module, the network connection trigger message; or automatically receiving, by the WiFi module, the network connection trigger message after being turned on in the case where the home appliance has not connected to a network or has not successfully connected to a network after being shipped from a factory.

5. The method of claim 1, wherein the network configuration information broadcast packet or the network configuration information comprises at least one selected from the group consisting of a service set identifier (SSID) and password information of a router, and a unique identification code of a mobile client.

6. A non-transitory computer-readable storage medium storing computer-executable instructions, the computer-executable instructions being configured for executing the method of claim 1.

7. A home appliance, comprising: a processor, a memory and a WiFi module;

wherein the memory stores one or more programs; and the one or more programs, when executed by the processor, cause the processor to enable the WiFi module to connect to a network by using a method for connecting the home appliance to the network, the method comprising:

receiving, by the WiFi module in the home appliance, a network connection trigger message;

entering, by the WiFi module, a monitoring mode according to the network connection trigger message;

in response to the WiFi module successfully receiving and parsing a network configuration information broadcast packet under the monitoring mode, connecting, by the home appliance, to the network;

in response to the home appliance failing to connect to the network, entering, by the WiFi module, a hotspot mode according to the network connection trigger message;

in response to the WiFi module successfully receiving network configuration information under the hotspot mode, connecting, by the home appliance, to the network;

in response to the WiFi module failing to receive the network configuration information within a preset period of time T3, or in response to the WiFi module receiving the network configuration information within a preset period of time T4 but the home appliance fails to connect to the network, determining by the WiFi module that the network connection fails and is ceased; and after the network connection fails and is ceased:

automatically driving, by the home appliance, the WiFi module to enter the monitoring mode-switch between the monitoring mode and the hotspot mode for connecting to the network within a preset time; or manually driving the WiFi module to switch between the monitoring mode and the hotspot mode for connecting to the network within a preset time in response to a touch of a button on the home appliance;

after the automatically driving or manually driving the WiFi module to switch between the monitoring mode and the hotspot mode, in response to the home appliance still failing to connect to the network, determining by the WiFi module that the network connection stops and maintenance is needed.

8. The home appliance of claim 7, wherein the home appliance failing to connect to the network comprises:

the WiFi module failing to receive the network configuration information broadcast packet within a first preset period of time T1, or the WiFi module failing to parse the network configuration information broadcast packet within a second preset period of time T2.

9. The home appliance of claim 8, wherein a duration of the first preset period of time T1 is less than or equal to that of the second preset period of time T2;

and a duration of the preset period of time T3 is less than or equal to that of the preset period of time T4.

10. The home appliance of claim 7, wherein receiving the network connection trigger message comprises:

in response to a touch of a button on the home appliance to send the network connection trigger message to the WiFi module, receiving, by the WiFi module, the network connection trigger message; or automatically receiving, by the WiFi module, the network connection trigger message after being turned on in the case where the home appliance has not connected to a network or has not successfully connected to a network after being shipped from a factory.

11. The home appliance of claim 7, wherein the network configuration information broadcast packet or the network configuration information comprises at least one selected from the group consisting of a service set identifier (SSID) and password information of a router, and a unique identification code of a mobile client.

12. A home appliance system, comprising a home appliance, a router, a server and a mobile terminal; wherein the home appliance comprises a WiFi module configured to connect the home appliance to the router, wherein the home appliance connects to the server via the router;

wherein the WiFi module is configured to receive a network connection trigger message, and enter a monitoring mode according to the network connection trigger message, and in response to the WiFi module successfully receiving and parsing a network configuration information broadcast packet under the monitoring mode, the home appliance connects to a network; and in response to the home appliance failing to connect to the network, the WiFi module enters a hotspot mode according to the network connection trigger message, and in response to the WiFi module successfully receiving network configuration information under the hotspot mode, the home appliance connects to the network;

in response to the WiFi module failing to receive the network configuration information within a preset period of time T3, or in response to the WiFi module receiving the network configuration information within a preset period of time T4 but the home appliance fails to connect to the network, the WiFi module is configured to determine that the network connection fails and is ceased; and after the network connection fails and is ceased:

the home appliance is configured to automatically drive the WiFi module to switch between the monitoring mode and the hotspot mode for connecting to the network within a preset time; or the WiFi module is configured to be manually driven to switch between the monitoring mode and the hotspot mode for connecting to the network within a preset time in response to a touch of a button on the home appliance;

after being automatically driven or manually driven to switch between the monitoring mode and the hotspot mode, the WiFi module is configured to, in response to the home appliance still failing to connect to the network, determine that the network connection stops and maintenance is needed wherein the server is configured to provide home appliance management platform services, including registration and management of a user account, binding and management of the home appliance and the user account, sending a control command to the home appliance, and receiving information reported by the home appliance; and wherein the mobile terminal is in communication with the router and the server.

\* \* \* \* \*